June 15, 1937.  F. A. CRITZ  2,084,244
FLUID BRAKE
Filed July 17, 1936  4 Sheets-Sheet 1
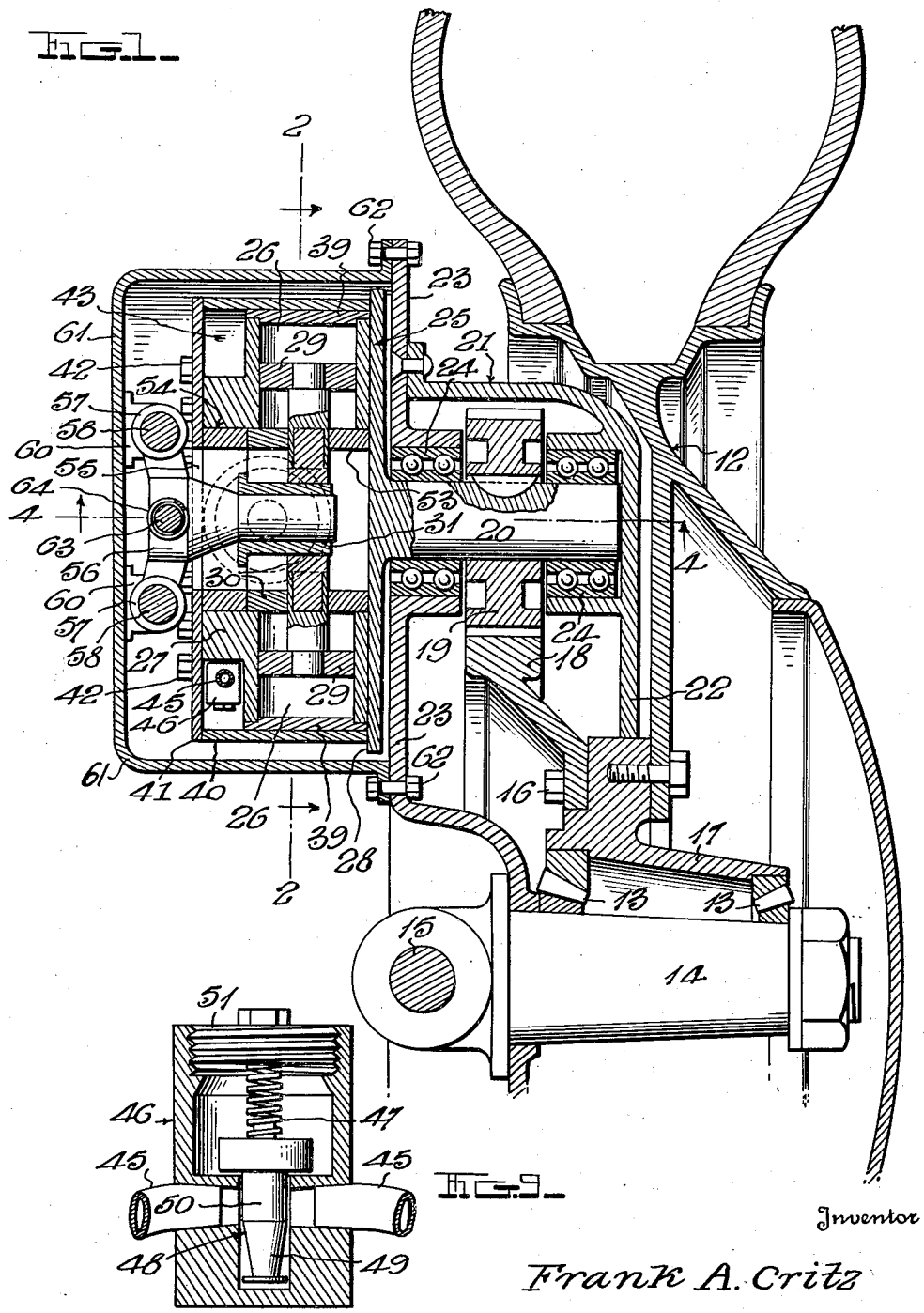
Inventor
Frank A. Critz

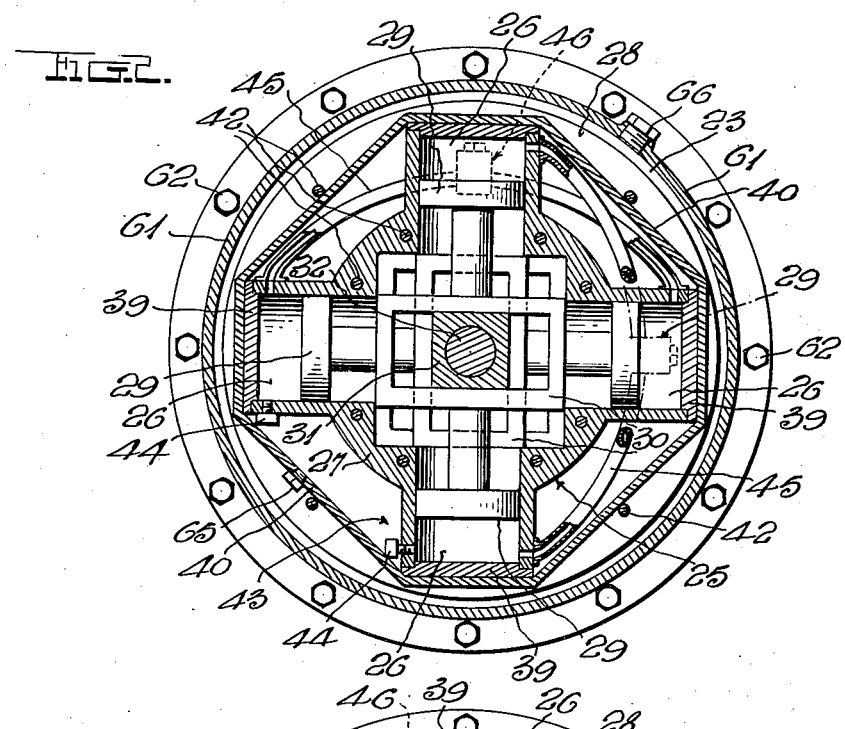
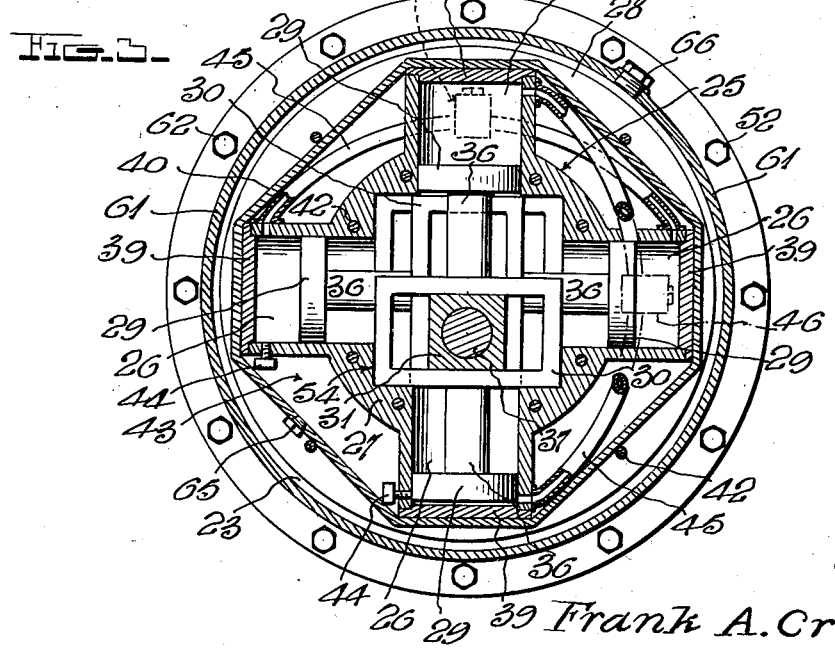

June 15, 1937.  F. A. CRITZ  2,084,244
FLUID BRAKE
Filed July 17, 1936  4 Sheets-Sheet 3
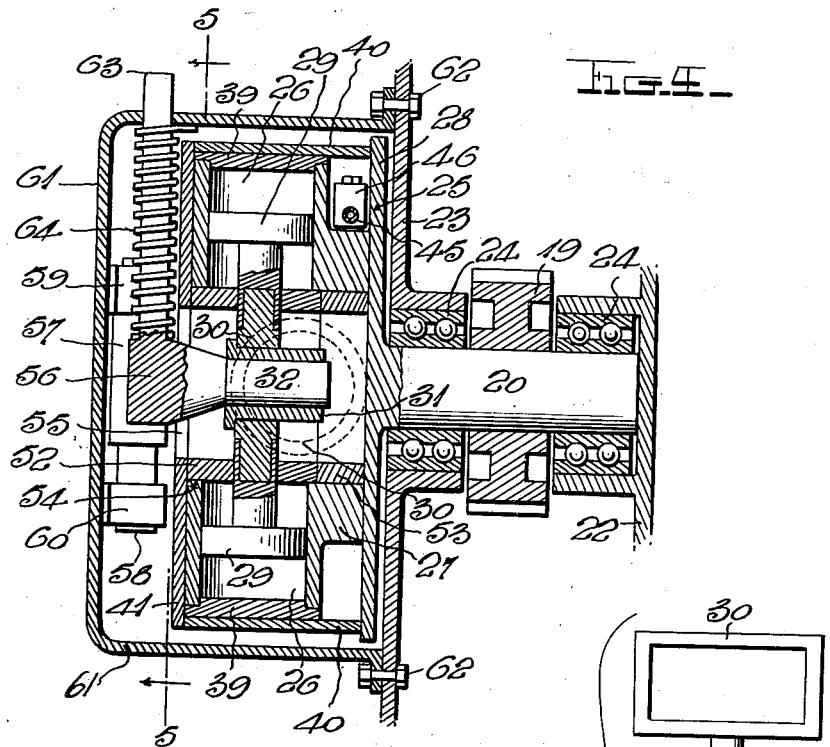
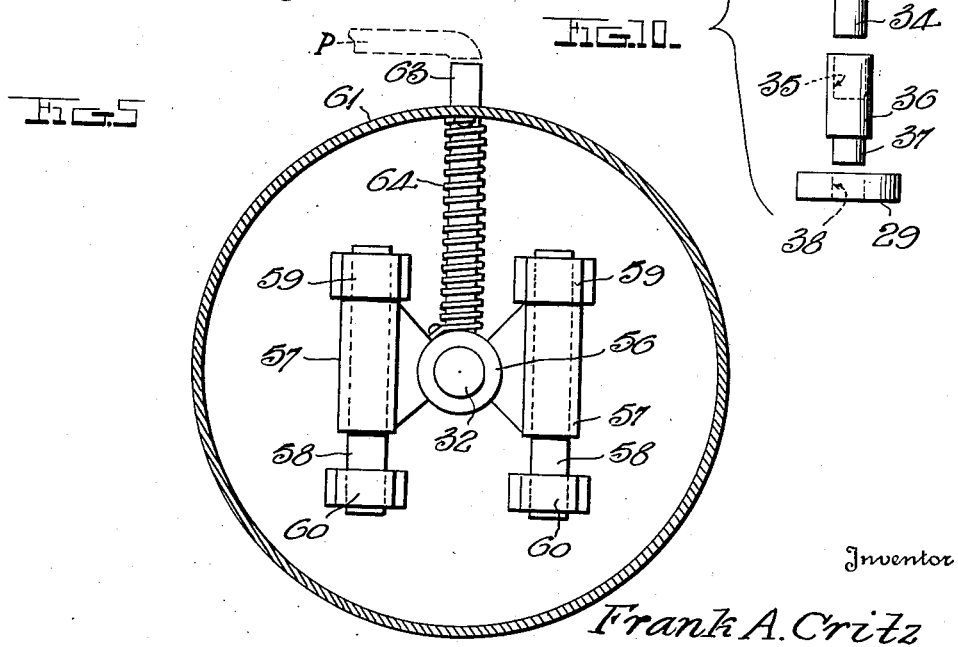
Inventor
Frank A. Critz
By *H. B. Willson & Co*
Attorneys June 15, 1937.  F. A. CRITZ  2,084,244
FLUID BRAKE
Filed July 17, 1936  4 Sheets-Sheet 4
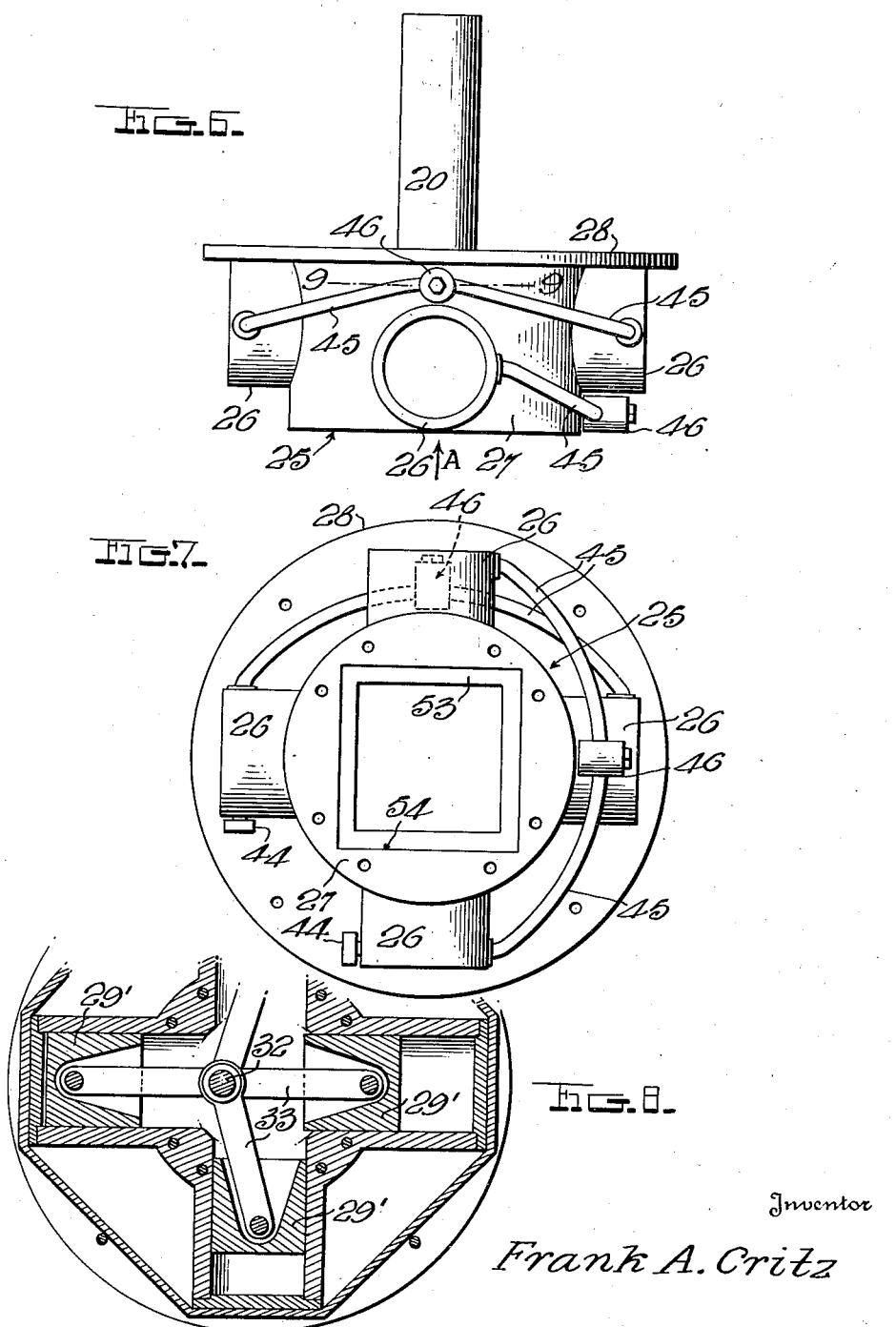
Inventor
Frank A. Critz Patented June 15, 1937

2,084,244

UNITED STATES PATENT OFFICE 2,084,244

FLUID BRAKE

Frank A. Critz, West Point, Miss.

Application July 17, 1936, Serial No. 91,198

14 Claims. (Cl. 188—91)

The invention relates generally to brakes of a type in which oil, air or other fluid is pumped to create a braking action, and while the invention is shown in connection with an automobile wheel, it is not restricted to this particular field of use.

One object of the invention is to provide a new and improved fluid brake in which pistons used for pumping a fluid to create the braking action, are normally idle, and in which novel provision is made for bringing said pistons into play with a stroke of more or less length, according to the amount of braking force required.

Another object is to provide a fluid brake having a centrifugally controlled valve through which the fluid is pumped, said valve being mounted on a rotatable part of the mechanism and moving toward maximum open position with increase in speed of said part and moving toward closed position with decreased speed of said part, preventing sudden locking of the automobile wheel or other member to which the braking action is applied, when rotating at high speed and gradually increasing the braking action as the speed is checked.

Another object is to provide a brake mechanism which may be expeditiously manufactured and installed and will be trouble free.

With the foregoing and minor objects in view, the invention resides in the novel subject matter hereinafter described and claimed, description being accomplished by reference to the accompanying drawings.

Figure 1 is a horizontal sectional view through the front wheel of an automobile and its mounting means, and one of the improved brakes operatively connected with said wheel.

Fig. 2 is a vertical sectional view substantially on line 2—2 of Fig. 1, slightly distorted however to cut through all of the cylinders even though the axes of these cylinders do not lie in a common plane but are offset as illustrated for instance in Fig. 6.

Fig. 3 is a view similar to Fig. 2 but showing the manner in which the pistons are reciprocated, said pistons being shown in their normal idle positions in said Fig. 2.

Fig. 4 is a vertical sectional view on line 4—4 of Fig. 1.

Fig. 5 is a vertical sectional view on line 5—5 of Fig. 4.

Fig. 6 is a side elevation of the rotatable head carrying the cylinders and the fluid-conducting passages and valves, and the carrying shaft for said head.

Fig. 7 is an elevation of the parts shown in Fig. 6, as indicated by the arrow A of said Figure 6.

Fig. 8 is a fragmentary sectional view similar to Figs. 2 and 3 and illustrating a different way of operatively connecting the pistons with the wrist pin by means of which they are normally caused to remain idle but are caused to reciprocate when a braking action is required.

Fig. 9 is a detail sectional view on line 9—9 of Fig. 6 showing one of the centrifugally controlled fluid valves.

Fig. 10 is a disassembled detail view illustrating the preferred details used in operatively connecting the pistons with their operating yokes.

While features of construction now considered preferred, have been illustrated and will be rather specifically described, it is to be understood that within the scope of the invention as claimed, numerous variations may be made. Furthermore, while the invention will be described in its association with an automobile wheel, attention is again invited to the fact that the invention is not restricted to this particular use.

An automobile wheel 12 is shown rotatably mounted by conventional bearings 13 upon a spindle 14 turnable in the usual way about a king-pin 15. Secured by bolts or the like 16 to the hub 17 of the wheel 12, is a relatively large gear 18 with which a comparatively small gear 19 on a short horizontal shaft 20 meshes. A casing 21 is provided for the gears 18 and 19, said casing including a side plate 22 between said gears and the wheel 12, and a fixed hub plate 23 suitable secured to the inner end of the spindle 14. The hub plate 23 and side plate 22 carry suitable bearings 24 for the shaft 20. One end of this shaft projects through the hub plate 23 and is provided with a head 25 having radial cylinders 26 which are disposed in pairs with the cylinders of each pair diametrically opposed. In forming the head 25 and connecting it with the shaft 20, it is preferable to provide a one-piece cylinder block 27, to weld this block to a disk 28 and to form this disk integrally with said shaft 20.

The fluid handling pistons 29 in the cylinders 26, may be of any desired form and provided with appropriate rings, packing or the like if required. In the form of construction shown in Figs. 1, 2, 3 and 4, the pistons 29 are operatively connected with rectangular yokes 30 through which a rectangular block 31 passes, said block being slidably engaged with said yokes and having a central opening through which a wrist pin 32 passes, the pistons being either held against reciprocation or caused to reciprocate by the position of said wrist pin. In Fig. 8, the pistons 29' are connected with the wrist pin 32 by pivoted connecting rods 33.

When the yokes 30 are employed, their opposite side bars are preferably provided with projecting studs 34 secured in sockets 35 in short rods 36, said rods having reduced ends 37 secured in openings 38 in the pistons 29, as detailed in Fig. 10.

The heads 39 of the cylinders 26 are held in place by a one-piece ring 40 which surrounds and abuts said cylinder heads. One edge of this ring 40 abuts the disk 28 and the opposite edge of said ring abuts a side plate 41 which is secured to the cylinder block 27 by means of bolts or the like 42. The space surrounded by the ring 40, between the disk 28 and the side plate 41, constitutes a reservoir 43 for the fluid to be used (preferably oil), and one cylinder of each pair is provided with an inwardly opening, outwardly closing admission valve 44 (Figs. 2, 3 and 7) communicating with said reservoir. The valve 44 may be an ordinary ball check valve well known in various arts. The cylinders of each pair are placed in communication with each other by a tube or the like 45 having a centrifugally controlled valve 46 (see more particularly Fig. 9) between its ends, said valve being urged toward its maximum closed position by a coiled spring 47. As the head 25 rotates however, the slidable valve member 48 moves outwardly by centrifugal force against the action of the spring 47 so that the conical end 49 of said valve member will control the flow of fluid from one cylinder to the other through the tube 45 when a braking action is started. When the head 25 is rotating at high speed, the spring 47 is fully compressed and the conical end 49 of the valve member 48 offers very little resistance to fluid flow through the tube 45, so that if the brake be suddenly brought into play, it cannot lock the wheel or cause breakage of any part of the pumping mechanism. As the speed gradually diminishes however, the spring 47 forces the valve member 48 toward its closed position, thereby gradually setting up more resistance to the flow of fluid and consequently increasing the braking action gradually. When the machine is at a standstill, the cylindrical part 50 of the valve member 48 permits little if any fluid flow so that the brake will hold the machine where stopped. If desired, provision may be made for adjusting the strength of the spring 47, for instance, by threading the screw plug 51 which closes one end of the valve casing, inwardly or outwardly, appropriate locking means (not shown) being of course provided for said plug.

The two yokes 30 rest slidably against each other, one square guiding frame 52 is positioned between one of these yokes and the side plate 41 of the head 25, and another square guiding frame 53 is positioned between the other yoke and the disk 28, said frames 52 and 53 fitting snugly into a square central opening 54 in the cylinder block 27. The side plate 41 is formed with an opening 55 through which the wrist pin 32 passes to the block 31 engaging the aforesaid yokes 30.

The outer end of the wrist pin 32 is provided with a T-head 56 (see Figs. 1, 4 and 5), said T-head having parallel guide sleeves 57 at its ends, the axes of said sleeves being disposed in a plane transverse to the axis of the wrist pin. These sleeves are slidable upon parallel guide rods 58 to the limit allowed by lugs 59 and 60 by which said rods are mounted in a housing 61 which is secured by bolts or the like 62 to the fixed hub plate 23. When the sleeves 57 rest against the lugs 59 as shown in Fig. 5, the wrist pin 32 is in axial alinement with the shaft 20 and even though the head 25 be rotating, no piston operation will be produced and therefore, the brake will offer no resistance toward wheel rotation. As the T-head 56 is moved toward the lugs 60, however, one eccentric relation or another is set up between the wrist pin 32 and the shaft 20, with the result that the pistons will be reciprocated to pump the fluid from one cylinder to another, the flow of such fluid being resisted according to the speed, by the centrifugally controlled valves 46, as above explained. When the fluid is forced from one cylinder 26 of any pair, it travels through the tube 35 and valve 46 into the other cylinder 26 of said pair, and the admission valves 44 merely serve to supply any deficiency due to possible leakage of the fluid from the cylinders back into the reservoir 43.

An operating rod 63 is connected with the T-head 56 of the wrist pin 32 and extends to the exterior of the casing 61 where any suitable operating means, a part of which is dotted at P in Fig. 5, may be provided for inwardly shifting said rod to move the wrist pin 32 toward the lugs 60 to create the desired braking action. A coil spring 64 may be provided to normally hold the T-head 56 upwardly with the sleeves 57 abutting the lugs 59, holding the wrist pin 32 in its inactive position. The spring 64 preferably surrounds the rod 63.

For filling the reservoir 43, an appropriate filling plug 65 (Figs. 2 and 3) is provided in the ring 40, and for giving access to said plug 65, another plug 66 is provided in the housing 61.

Any desired provision may, of course, be made for lubricating the gearing 18, 19, the bearings 24, the sleeves and rods 57, 58, the wrist pin 32, block 31 and yokes 30, and for lubricating the pivotal connections of the rods 33 if these rods be employed instead of the yoke and block connections.

In operation, the rotating wheel 12 causes the gearing 18 and 19 to rotate the shaft 20, thereby rotating the head 25 having the cylinders 26. As long as the wrist pin 32 is held in axial alinement with the shaft 20 by the spring 64 which normally holds the T-head 57 against the lugs 59 (Fig. 5), the pistons 29 will not reciprocate in the cylinders 26. However, when a braking action is desired, the operating mechanism, a part P of which is shown in Fig. 5, is actuated to slide the rod 63 downwardly thereby bringing the wrist pin 32 into eccentric relation with the shaft 20 and causing reciprocation of the pistons 29. The pistons 29 then force the fluid to and fro through the tubes 45, the valve 48 (Fig. 9) of said tubes being held open by centrifugal force as long as the head 25 is rotating with any appreciable speed. If the rod 63 be depressed only a slight extent, the pistons 29 pump only a small quantity of the fluid and thus create a relatively weak braking action, but as said rod is further depressed, said pistons pump more and more fluid and thus increase the braking action, and as the speed of rotation is gradually reduced, the valve 48 gradually closes, thereby gradually setting up more resistance to the flow of the pumped fluid and consequently increasing the braking action gradually. When the wheel is rotating at high speed, however, the valve 48 is fully open and therefore offers very little resistance to the pumped fluid so that if the brake be suddenly applied, it cannot lock the wheels or cause breakage of any part of the fluid-handling mechanism. When the machine is at a standstill, the cylindrical part 50 of the valve 48 permits little if any fluid flow causing the brake to hold the machine where stopped.

It will be seen from the foregoing that novel and advantageous provision has been made for carrying out the objects of the invention, and while features of construction now considered preferred, have been illustrated and specifically described, attention is again invited to the possibility of making variations within the scope of the invention as claimed.

I claim:—

1. A brake for a rotatable member comprising a head rotatably mounted on an axis parallel with the axis of rotation of said member, said head having radial fluid-handling cylinders, gearing whereby said member drives said head, fluid-handling pistons in said cylinders, shiftable means operatively connected with said pistons for causing reciprocation thereof when braking action is required and for normally preventing such reciprocation, and means for shifting said shiftable means as required.

2. A brake comprising a rotary head driven by a member to which a braking action is to be applied, said head having radial fluid-handling cylinders, fluid-handling pistons in said cylinders, a wrist pin operatively connected with said pistons, a slide carrying said wrist pin, fixed guide means for said slide allowing shifting of the latter transverse to the axis of rotation of said head, whereby said wrist pin may be shifted from a normal inactive position in axial alinement with said axis to various piston-operating positions eccentric to said axis, and means for shifting said slide as required.

3. A brake comprising a rotary head driven by a member to which a braking action is to be applied, said head having radial fluid-handling cylinders, fluid-handling pistons in said cylinders, a wrist pin operatively connected with said pistons and having a T-head, the ends of said T-head being provided with parallel sleeves whose axes are in a plane at right angles to that of said wrist pin, two fixedly mounted parallel guide rods slidably surrounded by said sleeves, whereby said T-head may be shifted to shift said wrist pin from a normal inactive position in axial alinement with the axis of rotation of said rotary head to various piston-operating positions eccentric to said axis, and means for shifting said T-head as required.

4. A brake comprising a rotary head driven by a member to which a braking action is to be applied, said head having radial fluid-handling cylinders, fluid-handling pistons in said cylinders, a wrist pin operatively connected with said pistons and having a T-head, the ends of said T-head being provided with parallel sleeves whose axes are in a plane at right angles to that of said wrist pin, two fixedly mounted parallel guide rods slidably surrounded by said sleeves, whereby said T-head may be shifted to shift said wrist pin from a normal inactive position in axial alinement with the axis of rotation of said rotary head to various piston-operating positions eccentric to said axis, an operating rod secured to said T-head and disposed parallel with said guide rods for shifting said T-head in brake-applying direction, and a spring surrounding said operating rod for yieldably holding said T-head in normal position.

5. A brake comprising a rotary head driven by a member to which a braking action is to be applied, said head having radial fluid-handling cylinders, a fixed non-rotatable housing surrounding said rotary head and having an end wall spaced from said head and extending transversely of the axis of rotation of said head, fluid-handling pistons in said cylinders, a wrist pin operatively connected with said pistons, a slide carrying said wrist pin and located in the space between said head and said end wall, guiding means for said slide fixedly carried by said end wall and allowing shifting of said slide to shift said wrist pin from a normal inactive position in axial alinement with the axis of rotation of said head to various positions eccentric to said axis, and shifting means for said slide connected with the same and extending to the exterior of said housing.

6. A brake comprising a rotary head driven by a member to which a braking action is to be applied, said head having radial fluid-handling cylinders, a fixed non-rotatable housing surrounding said rotary head and having an end wall spaced from said head and extending transversely of the axis of rotation of said head, fluid-handling pistons in said cylinders, a wrist pin operatively connected with said pistons and having a T-head located in the space between said head and said end wall, the ends of said T-head being provided with parallel sleeves whose axes are in a plane at right angles to the axis of said wrist pin, two parallel guide rods slidably surrounded by said sleeves and secured to said end wall, whereby said T-head may be shifted to shift said wrist pin from a normal inactive position in axial alinement with the axis of rotation of said head to various positions eccentric to said axis of rotation, an operating rod secured to said T-head in parallel relation with said sleeves and extending to the exterior of the housing for shifting said T-head in brake-applying direction, and a spring surrounding said operating rod for yieldably holding said T-head in normal position.

7. In a brake, a normally idle fluid-handling pump driven by a member to which a braking action is to be applied, means for bringing said pump into play when a braking action is required, a passage through which said pump forces fluid when operating, and a centrifugally controlled valve for said passage movable toward maximum open position as the speed of said member increases and movable toward closed position as the speed of said member decreases.

8. In a brake, a rotary head driven by a member to which a braking action is to be applied, said head having a fluid-handling cylinder, a normally idle piston in said cylinder, means for causing reciprocation of said piston when a braking action is required, a passage through which said piston forces a fluid when reciprocating, and a centrifugally controlled valve for said passage mounted on said rotary head, said valve being movable toward maximum open position as the speed of said head increases and movable toward closed position as the speed of said head decreases.

9. In a brake, a rotatably mounted disk driven by a member to which a braking action is to be applied, a cylinder block secured to one side of said disk and having pairs of opposed radial fluid-handling cylinders, the axes of said pairs of cylinders being offset, fluid-handling pistons in said cylinders, rectangular yokes at the inner ends of the cylinders and operatively connected with said pistons, a block slidable within said yokes and having a bearing opening, a wrist pin received in said bearing opening, and means for shifting said wrist pin from a normal inactive position in axial alinement with the axis of rotation of said disk to various piston-operating positions eccentric to said axis.

10. In a brake, a rotatably mounted disk driven by a member to which a braking action is to be applied, a cylinder block secured to one side of said disk and having pairs of opposed radial fluid-handling cylinders, the axes of said pairs of cylinders being offset, fluid-handling pistons in said cylinders, rectangular yokes at the inner ends of the cylinders and operatively connected with said pistons, said yokes being in sliding contact with each other, a side plate secured to the side of the cylinder block remote from said disk, two yoke-guiding frames disposed between said yokes and said disk and side plate and lying slidably against said yokes, and means for causing operation of said pistons when a braking action is required.

11. In a brake, a rotatably mounted disk, driven by a member to which a braking action is to be applied, a cylinder block secured to one side of said disk and having radial fluid-handling cylinders, heads closing the outer ends of said cylinders, a ring surrounding said cylinder block and heads and securing the latter in place, one edge of said ring abutting said disk, a side plate abutting the other edge of said ring and secured against the side of said cylinder block remote from said disk, the space circumscribed by said ring constituting a reservoir for the fluid to be handled by said cylinders, normally idle pistons in said cylinders, and means for bringing said pistons into play to pump the fluid when a braking action is required.

12. In a brake for a vehicle wheel rotatably mounted at the outer side of a fixed hub plate; a gear secured to the wheel and disposed between said wheel and said hub plate, a bearing rigidly carried by said hub plate in outwardly spaced relation with the periphery of said gear, a short horizontal shaft rotatably mounted in said bearing and having a gear meshing with the aforesaid gear, a head secured to said shaft and disposed at the side of said hub plate remote from the wheel, said head having radial fluid-handling cylinders, fluid-handling pistons in said cylinders, shiftable means operatively connected with said pistons for causing reciprocation thereof when braking action is required and for normally preventing such reciprocation, and means for shifting said shiftable means as required.

13. In a brake for a vehicle wheel rotatably mounted at the outer side of a fixed hub plate; a gear secured to the wheel and disposed between said wheel and said hub plate, a bearing rigidly carried by said hub plate in outwardly spaced relation with the periphery of said gear, a short horizontal shaft rotatably mounted in said bearing and having a gear between its ends meshing with the aforesaid gear, a head secured to one end of said shaft and disposed at the side of said hub plate remote from the wheel, a housing for said gears having a bearing in which the other end of said shaft is mounted, said head being provided with radial fluid-handling cylinders, fluid-handling pistons in said cylinders, shiftable means operatively connected with said pistons for causing reciprocation thereof when braking action is required and for normally preventing such reciprocation, and means for shifting said shiftable means as required.

14. In a brake for a vehicle wheel, a gear secured to the inner side of said wheel, a casing surrounding said gear and including a side plate between said gear and said wheel and a fixed hub plate at the opposite side of said gear, a second gear within said casing and meshing with the first mentioned gear, a short shaft on which said second gear is secured, said shaft extending through said hub plate, bearings for said shaft carried by said hub plate and said side plate, a head on the end of said shaft which extends through said hub plate, said head having radial fluid-handling cylinders, normally idle fluid-handling pistons in said cylinders, a housing surrounding said head and cylinders and secured to said hub plate, and means for bringing said pistons into play when a braking action is required.

FRANK A. CRITZ.